July 11, 1933.                A. Y. DODGE                1,917,928
BRAKE OPERATING MECHANISM
Original Filed July 27, 1925        2 Sheets-Sheet 1
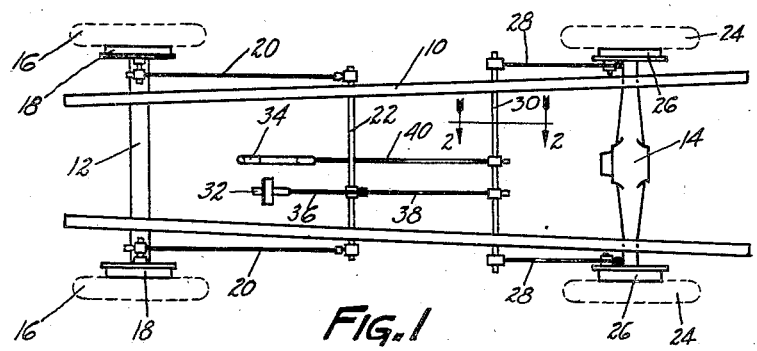
Fig. 1
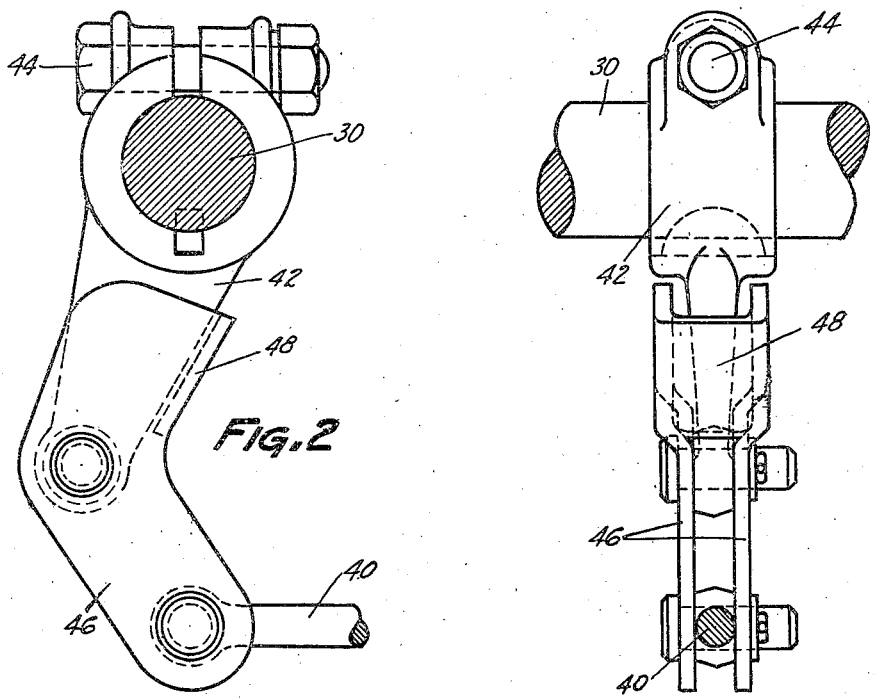
Fig. 2
Fig. 3
INVENTOR
ADIEL Y. DODGE
BY
M. W. McConkey
ATTORNEY July 11, 1933.                A. Y. DODGE                  1,917,928
                          BRAKE OPERATING MECHANISM
                    Original Filed July 27, 1925    2 Sheets-Sheet 2

INVENTOR
ADIEL Y. DODGE
BY
ATTORNEY

Patented July 11, 1933

1,917,928

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE OPERATING MECHANISM

Application filed July 27, 1925, Serial No. 46,241. Renewed August 12, 1932.

This invention relates to brakes, and is illustrated as embodied in an automobile chassis having brakes on all four wheels. An object of the invention is to provide a reliable but inexpensive type of over-running joint for the brake-applying lever, by pivoting on an arm secured to the brake shaft a lever connected to the brake-applying lever and having a part behind and engageable with the arm. Preferably this lever is stamped from sheet metal in a manner providing sides straddling the arm and pivoted thereto, and a cross connecting piece behind the arms.

The above and other objects and features of the invention will be apparent from the following description of the illustrative embodiments shown in the accompanying drawings, in which:

Fig. 1 is a top plan view of an automobile chassis, showing the brake-operating connections;

Fig. 2 is a section on the line 2—2 of Fig. 1, showing one of the over-running connections in side elevation;

Fig. 3 is a view of the over-running connection looking from the right toward the left in Fig. 2;

Figure 4:
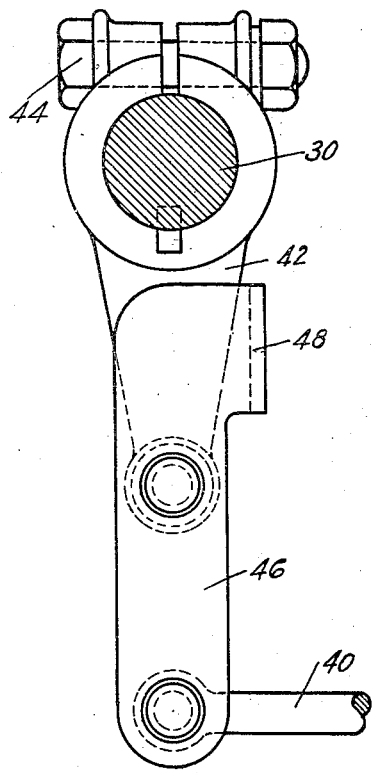
Fig. 4 is a view corresponding to Fig. 2, but showing a modification.
Figure 5:
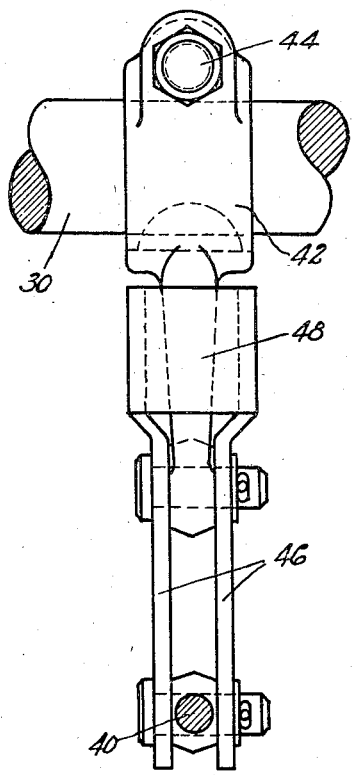
Fig. 5 is a view of the modification, looking from the right toward the left in Fig. 4.

The chassis illustrated includes a frame 10 supported by the usual springs on a front axle 12 and a rear axle 14. The front wheels 16 have brakes 18 operated by brake rods or the like 20 connected to arms on a shaft 22, and the rear wheels 24 have brakes 26 operated by means such as brake rods 28 connected to arms on a shaft 30. The four brakes are intended to be operated by a service pedal 32, while the rear brakes may be operated separately by an emergency lever 34. Pedal 32 is connected by a rod 36 to an arm on shaft 22, and both the arm and the rod 36 are connected to a tension element such as a brake rod 38 extending adjacent shaft 30. Another tension element 40 extends from the emergency lever 34 adjacent shaft 30.

On shaft 30 are secured two arms 42, shown as held by clamp screws 44. At the end of each arm 42 is pivoted a bell-crank lever stamped from sheet-metal to form sides 46 straddling the arm and pivoted thereto, connected between the shaft and pivot by a cross part 48 behind and engageable with the arm. The end of the tension element 40 (or 38) extends between the bottom ends of sides 46 and is pivotally connected thereto.

While illustrative embodiments have been described in detail, it is not my intention to limit the scope of the invention to those particular embodiments, or otherwise than by the terms of the appended claims.

I claim:

1. An over-running connection comprising, in combination, an operating arm, a bellcrank lever having two parallel sides straddling said arm and pivoted thereto and having a cross part connecting said sides behind the arm and engageable with the arm when the lever is moved in one direction, and a tension connection of substantially the thickness of the arm pivotally connected between the ends of said parallel sides.

2. An over-running connection comprising a shaft provided with an arm, a lever pivotally mounted on the outer end of the arm, said lever having a part which straddles the arm and extends rearwardly therealong away from its pivot toward the shaft, and a connection pivotally engaged with the outer end of the lever, said lever being so formed as to straddle such connection.

3. An over-running connection comprising, in combination, a shaft having an arm fixed thereto, a sheet metal lever pivoted to the outer end of the arm and having a channel portion straddling the same and extending thereover away from its pivoted point, the opposite sides of said channel portion being continued outwardly beyond the pivotal connection with the arm and having an operating connection pivotally supported between their outer ends.

In testimony whereof I have hereunto signed my name.

ADIEL Y. DODGE.